GRUVER & WIGGINS.
Churn.
No. 70,431.    Patented Nov. 5, 1867.
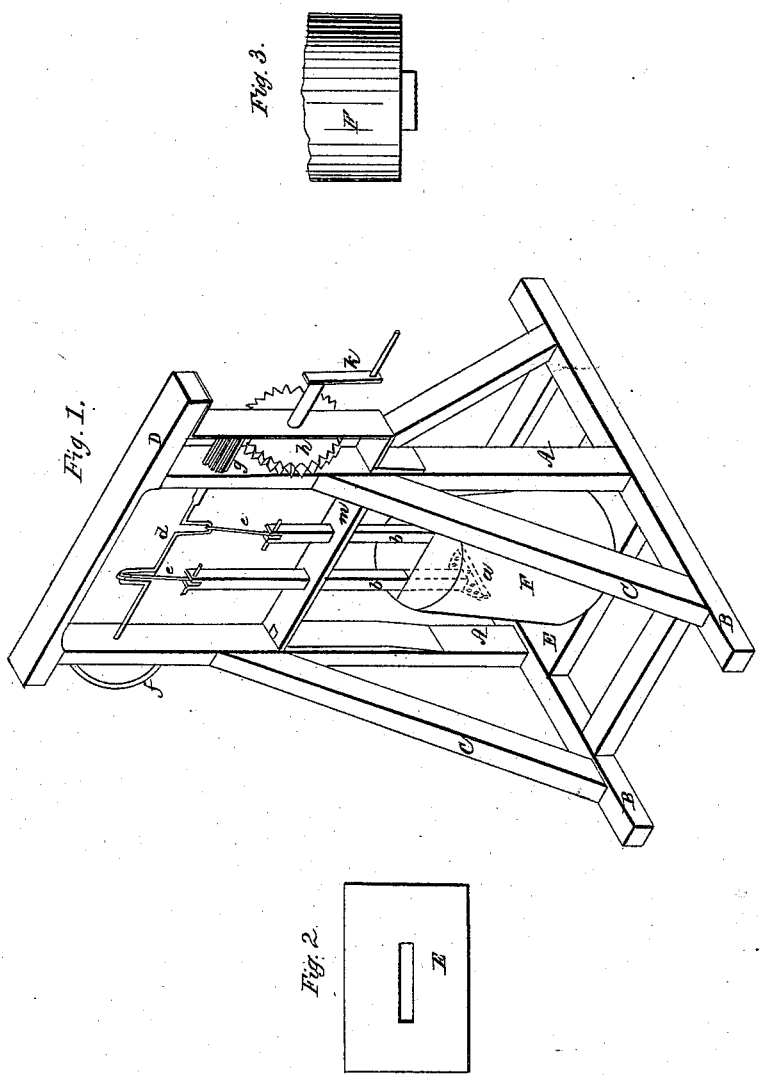

United States Patent Office.

JAMES J. GRUVER AND AMBROSE D. WIGGINS, OF NEW MARKET, OHIO.

Letters Patent No. 70,431, dated November 5, 1867.

IMPROVEMENT IN CHURNS.

The Schedule referred to in these Letters Patent and making part of the same.

TO ALL WHOM IT MAY CONCERN:

Be it known that we, JAMES J. GRUVER and AMBROSE D. WIGGINS, of New Market, State of Ohio, have invented certain new and useful Improvements in Churns; and we declare the following to be a full, true, and exact description of the same, reference being had to the accompanying drawings, and to the letters of reference marked thereon.

Figure 1 is a perspective view of our invention.

Figure 2 is a plan view of the bed-piece for the churn.

Figure 3 is a side elevation of the lower part of the churn.

To enable others skilled in the art to make and use our invention, we will now describe its construction and operation.

A A are two uprights, let into sills B B, and supported by props C C. D is a cross-piece, which connects the two uprights A A at the top. E represents the bed-piece, held between the sills B B. The said bed-piece is provided with a slot, as shown in fig. 2. F is the churn, the bottom of which has a projection or tenon, $h$, as seen in fig. 3. This tenon rests in slot or mortise in bed-piece E, and serves to keep the churn steady while in operation. $a\ a$ are the dashers, provided with holes. $b\ b$ represent the dasher-bars, which are connected to the double crank-shaft $d$ by means of the pitmen $e\ e$. The said pitmen are made adjustable to the dasher bars, as seen in fig. 1. On one end of the crank-shaft $d$ is the fly or balance-wheel $f$. On the opposite end is the pinion $g$, which gears in the driving-wheel $h$. K is the crank, by means of which motion is given to crank-shaft $d$. $m$ represents an adjustable guide-board, through which the dasher-bars $b\ b$ work.

The operation of our churn is so apparent that no description of it is required.

What we claim, and desire to secure by Letters Patent, is—

The slotted bed-piece E, churn F, when provided with tenon $h$, and adjustable guide-board $m$, all arranged in connection with dasher-bars $b\ b$, pitmen $e\ e$, and double crank-shaft $d$, as and for the purpose set forth.

In testimony that we claim the above as our own we affix our signatures in presence of two witnesses.

JAS. J. GRUVER,
AMBROSE D. WIGGINS.

Witnesses:
THOS. A. McCONNAUGHY,
JAS. S. BERRY.